Dec. 19, 1950 — G. E. DATH — 2,534,418
SHOCK ABSORBER FOR RAILWAY CAR TRUCKS
Filed Feb. 3, 1949 — 2 Sheets-Sheet 1

Inventor:
George E. Dath.
By Henry Fucks
Atty.

Dec. 19, 1950     G. E. DATH     2,534,418
SHOCK ABSORBER FOR RAILWAY CAR TRUCKS

Filed Feb. 3, 1949     2 Sheets-Sheet 2

Inventor:
George E. Dath.
By Henry Fuchs.
Atty.

Patented Dec. 19, 1950

2,534,418

UNITED STATES PATENT OFFICE 2,534,418

SHOCK ABSORBER FOR RAILWAY CAR TRUCKS

George E. Dath, Mokena, Ill., assignor to W. H. Miner, Inc., Chicago, Ill., a corporation of Delaware Application February 3, 1949, Serial No. 74,402

4 Claims. (Cl. 267—9)

1

This invention relates to improvements in shock absorbers especially adapted for use as snubbing devices for dampening the action of railway car truck springs.

One object of the invention is to provide a friction shock absorber of relatively high capacity, comprising a plurality of relatively slidable friction elements and a pair of spring resisted friction shoes slidable on certain of said elements and having wedging engagement with each other to force the same against the cooperating friction elements to augment the frictional resistance provided by relative sliding movement of said elements on each other.

Other objects of the invention will more clearly appear from the description and claims hereinafter following.

Figure 1:
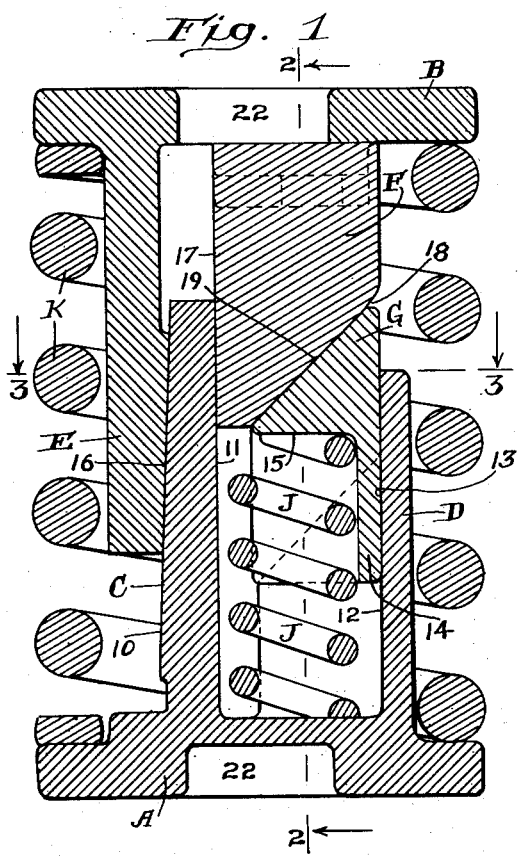
Figure 2:
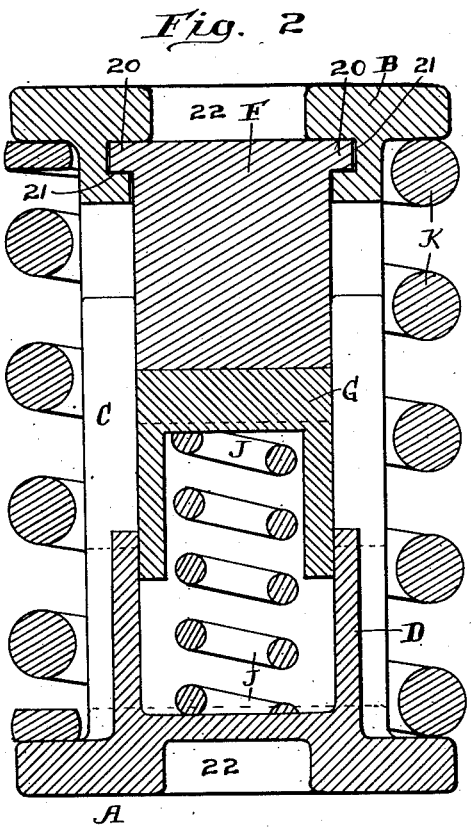
Figure 3:
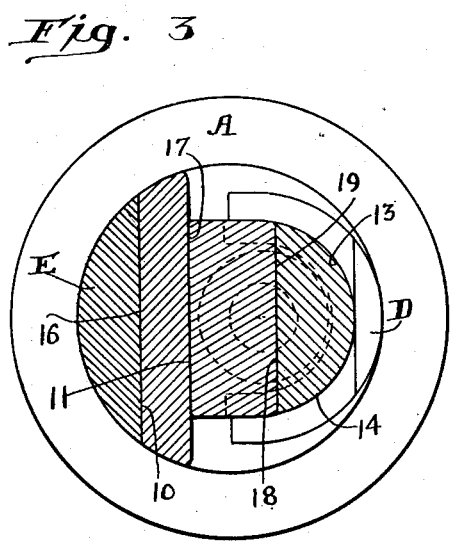
Figure 4:
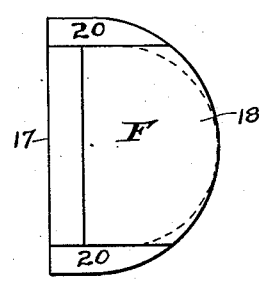
Figure 5:
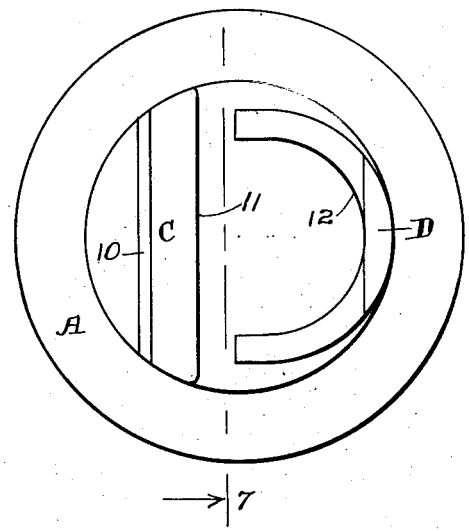
Figure 6:
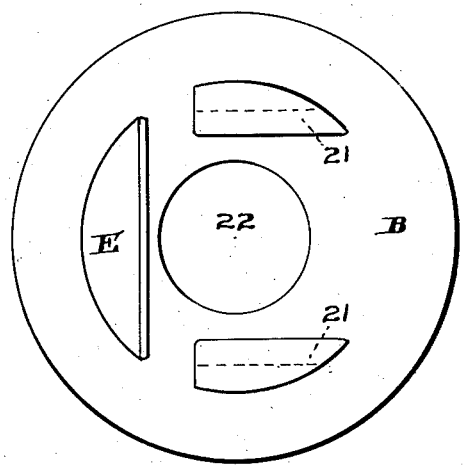
Figure 7:
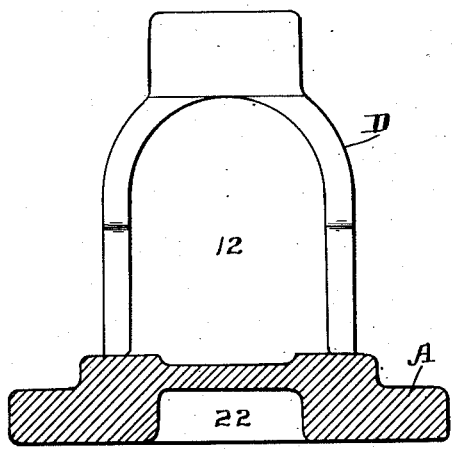
Figure 8:
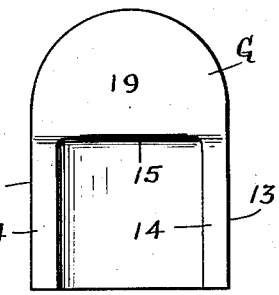

In the accompanying drawings forming a part of this specification, Figure 1 is a vertical sectional view of the improved shock absorber. Figure 2 is a transverse, vertical sectional view, corresponding substantially to the line 2—2 of Figure 1. Figure 3 is a horizontal sectional view, corresponding substantially to the line 3—3 of Figure 1. Figure 4 is a bottom plan view of the combined wedge and friction shoe of my improved shock absorber, as shown in Figure 1. Figure 5 is a top plan view of the bottom follower, friction post, and friction plate shown in Figure 1. Figure 6 is a bottom plan view of the top follower and friction post. Figure 7 is a vertical sectional view, corresponding substantially to the line 7—7 of Figure 5. Figure 8 is a side elevational view of the friction shoe shown in Figure 1, looking from left to right in said figure.

The improved shock absorber comprises broadly a bottom follower A, a top follower B, a bottom friction post C, a friction plate D upstanding from the bottom follower, a top friction post E depending from the top follower B, a combined wedge and friction shoe F carried by the top follower and having sliding frictional engagement with the bottom post C, a friction shoe G having sliding engagement with the friction plate D of the bottom follower A and in wedging engagement with the combined wedge and shoe F, a relatively light spring J opposing relative movement of the shoe G and bottom follower A, and a heavy spring K surrounding the posts C and E and the friction plate D, opposing relative movement of the followers A and B toward each other and pressing the posts into tight frictional engagement with each other.

The bottom follower A is in the form of a heavy disclike plate having the post C and the

2 plate D upstanding therefrom and formed integral therewith. The post C is located at the left hand side of the mechanism, as shown in Figure 1, and has lengthwise extending friction surfaces 10 and 11 at the outer and inner sides thereof, the friction surface 10 being inclined inwardly in upward direction and the surface 11 extending substantially vertically.

The friction plate D is spaced laterally from the post C, being located at the right hand side of the follower A. The plate D is of curved, transverse cross section, with the concave hollow side thereof facing the inner side of the post C. The plate D presents a vertically extending, transversely curved friction surface 12 on its inner side facing the friction surface 11 of the post C.

The friction shoe G is in the form of a block provided with a lengthwise extending, transversely curved friction surface 13 on its outer side slidingly engaged with the friction surface 12 of the plate D. As shown in Figures 1 and 8, the shoe G is cut away on its inner side at the lower end thereof, providing a downwardly extending, curved flange 14 at its outer side and a transverse, downwardly facing, horizontal abutment face 15. The friction surface 13 of the shoe extends to the lower end of the flange 14, being continuous from end to end of the shoe. Downward movement of the shoe G is opposed by the spring J, which is in the form of a helical coil having its top and bottom ends, respectively, bearing on the abutment face 15 of the shoe and the top side of the follower A.

The top follower B is also in the form of a heavy disclike plate having the post E depending therefrom and formed integral therewith. The post E is located on said follower to the left of the bottom post C, as shown in Figure 1, and has a lengthwise extending, flat friction surface 16 on its inner side, correspondingly inclined to and in sliding engagement with the friction surface 10 of the bottom post C.

The combined wedge and friction shoe F is in the form of a block, having a lengthwise extending, flat friction surface 17 on its left hand side, as seen in Figure 1, slidingly engaged with the friction surface 11 on the inner side of the post C. The combined wedge and friction shoe F and the shoe G have cooperating flat wedge faces 18 and 19, respectively, the wedge face 18 being located at the bottom end of the former and the face 19 at the top end of the latter. The combined wedge and shoe F is carried by the follower B, being provided with laterally projecting, horizontal guide flanges 20—20 on opposite sides at the upper end thereof, slidingly engaged in horizontal guide grooves formed in laterally spaced, depending guide flanges 21—21 on the follower B. The guide flanges 21—21 extend in a direction transverse to the friction posts E and C, that is, in a direction normal to the flat inner friction surface 11 of the post C, the combined wedge and shoe F being thus slidable laterally toward and away from the friction surface 11 but movable upwardly and downwardly in unison with the top follower B.

The spring K, which surrounds the posts E and C and the friction plate D is in the form of a helical coil spring having its top and bottom ends bearing on the top and bottom followers B and A. As seen in Figure 1, the inner side of the top coil of the spring K bears at the left hand side of the mechanism, on the outer side of the post E at a point adjacent the follower B, and the inner side of the bottom coil at the right hand side of the mechanism bears on the outer side of the base of the friction plate D.

The improved shock absorber replaces one or more of the spring units of a truck spring cluster of a railway car, being interposed between the usual top and bottom spring plates of the cluster, the top and bottom followers B and A being preferably recessed, as indicated at 22—22, to accommodate the usual spring centering projections of the spring follower plates, which cooperate with the springs of the cluster.

The operation of the improved shock absorber is as follows: Upon the spring cluster of the truck of a railway car being compressed between the spring follower plates of the cluster, the improved shock absorber, which is disposed between the follower plates, is compressed therewith, thereby moving the top follower B, the friction post E, and the combined wedge and shoe F downwardly against the resistance of the springs J and K. During this downward movement of the parts, the post E slides on the outer surface 10, and the combined wedge and shoe F slides on the inner surface 11 of the post C, and the shoe G slides on the friction surface 12 of the plate D resisted by the spring J. Due to the wedging action produced therebetween, the combined wedge and shoe F and the shoe G are forced apart, pressing the friction surfaces thereof into tight frictional engagement with the cooperating friction surfaces of the post C and the plate D. Due to the inclination of the cooperating friction surfaces thereof, the posts E and C are forced laterally outwardly away from each other, thereby displacing the top follower B toward the left and the bottom follower A to the right with respect to each other, as viewed in Figure 1. Inasmuch as the relative displacement of the followers is resisted by the inherent tendency of the spring K to oppose distortion by lateral outward pressure of the post E of the follower B on the inner side of the top coil of said spring, at the left hand side of the mechanism, as shown in Figure 1, and lateral outward pressure of the plate D of the follower A on the inner side of the bottom coil of said spring at the right hand side of the mechanism, the friction surfaces of the posts are pressed tightly together with increasing force as the mechanism is being compressed. High shock absorbing capacity is thus had, the frictional resistance produced between the posts during relative sliding movement thereof being augmented by the frictional resistance produced between the combined wedge and shoe and post C and between the shoe G and the plate D. Upon recoil of the truck springs, the parts of the shock absorber are returned to the normal position shown in Figure 1 by the springs J and K.

I claim:

1. In a friction shock absorber, the combination with end followers relatively movable toward and away from each other; of a friction post on each follower projecting toward the other follower, said posts being in sliding frictional engagement with each other; a friction plate on one of said followers spaced laterally from the post thereof and projecting toward the other follower; a combined wedge and friction shoe movable in unison with said last named follower lengthwise of the mechanism; a friction shoe in wedging engagement with said combined wedge and shoe, said shoe and combined wedge and shoe being engaged between said plate and post of the corresponding follower in sliding frictional engagement therewith; spring means between said shoe and the follower on which said plate is carried for yieldingly opposing movement of said shoe toward said last named follower; and spring means between said followers yieldingly opposing relative movement of said followers toward each other and pressing the posts against each other.

2. In a friction shock absorber, the combination with a follower having a friction post projecting therefrom, said post having friction surfaces on opposite sides thereof; of a second follower having a friction post projecting therefrom in lengthwise sliding engagement with the friction surface at one side of said first named post; a friction plate on said first named follower spaced laterally from the friction surface at the other side of said first named post, said plate extending toward said second named follower; a friction shoe; a combined wedge and friction shoe movable in unison with said second named follower lengthwise of the mechanism, said combined wedge and shoe being in wedging engagement with said shoe, said shoe and combined wedge and shoe having sliding frictional engagement between said plate and first named post; a spring reacting between said first named follower and said shoe yieldingly opposing movement of said shoe toward said first named follower; and spring means between said followers yieldingly opposing relative movement of said followers toward each other and pressing the posts into tight frictional contact with each other.

3. In a friction shock absorber, the combination with end followers relatively movable toward and away from each other; of a friction post on each follower projecting toward the other follower, said posts having inclined friction surfaces in sliding frictional engagement with each other; a friction plate on one of said followers spaced laterally from the post thereof and projecting toward the other follower; a combined wedge and friction shoe movable in unison with said last named follower lengthwise of the mechanism; a friction shoe in wedging engagement with said combined wedge and shoe, said shoe and combined wedge and shoe being engaged between said plate and post of the corresponding follower in sliding frictional engagement therewith; spring means between said shoe and the follower on which said plate is carried for yieldingly opposing movement of said shoe toward said last named follower; and spring means between said followers yieldingly opposing relative movement of said followers toward each other and pressing the posts against each other.

4. In a friction shock absorber, the combination with a follower having a friction post projecting therefrom, said post having friction surfaces on opposite sides thereof, one of said friction surfaces being inclined; of a second follower having a friction post projecting therefrom, having an inclined friction surface in lengthwise sliding engagement with the inclined friction surface of said first named post; a plate on said first named follower spaced laterally from the other friction surface of said first named post, said plate extending toward said second named follower; a friction shoe; a combined wedge and friction shoe movable in unison with said second named follower lengthwise of the mechanism, said combined wedge and shoe being in wedging engagement with said shoe, said shoe and combined wedge and shoe having sliding frictional engagement between said plate and first named post; a spring reacting between said first named follower and said shoe yieldingly opposing movement of said shoe toward said first named follower; and spring means between said followers yieldingly opposing relative movement of said followers toward each other and pressing said posts into tight frictional contact with each other.

GEORGE E. DATH.

REFERENCES CITED

The following references are of record in the file of this patent:

UNITED STATES PATENTS

| Number | Name | Date |
|---|---|---|
| 1,008,670 | O'Connor | Nov. 14, 1911 |
| 1,884,520 | Barrows | Oct. 25, 1932 |
| 2,379,078 | Haseltine | June 26, 1945 |
| 2,416,691 | Haseltine | Mar. 4, 1947 |